United States Patent Office 3,536,745
Patented Oct. 27, 1970

3,536,745
HALOALKOXYSILANES
Robert E. A. Dear, Morristown, N.J., assignor to Allied Chemical Corporation, New York, N.Y., a corporation of New York
No Drawing. Filed Jan. 5, 1968, Ser. No. 695,863
Int. Cl. C07f 7/04, 7/18
U.S. Cl. 260—448.8
7 Claims

ABSTRACT OF THE DISCLOSURE

Novel haloalkoxysilanes of the formula

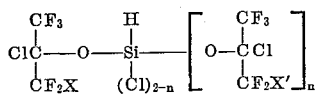

wherein X and X' are independently F or Cl, and wherein $n$ is 0 or 1, are respectively prepared by reacting trichlorosilane or a compound of the formula

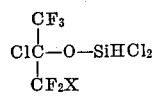

with hexafluoroacetone or chloropentafluoroacetone. These novel compounds are nematocidal fumigants.

BACKGROUND OF THE INVENTION

This invention relates to certain novel haloalkoxysilanes and their preparation, to use of these haloalkoxysilanes as nematocidal fumigants, to nematocidal fumigant compositions, and, more particularly, to a process for treating soil infested with nematodes.

Many different kinds of plants are known to be attacked by nematodes which are tiny worm-like organisms which live in the soil and feed on the roots of plants, both in the field and in greenhouses. Plants infested by nematodes will present a weakened, sickly appearance without visible injury to the stem or to any part of the plant above ground. An examination of the roots will show numerous types of injury including knots or galls characterized by a swollen appearance. In cases of severe infestation, these injuries not only reduce the size and effectiveness of the root system, but also seriously affect other plant parts.

It is known to control nematodes by applying to nematode-infested soil compounds which, when so applied, will vaporize and thoroughly permeate the soil, thus killing large proportions of those damaging organisms. Although various nematocidal fumigants have been proposed, there is a need for new and highly effective nematocidal fumigants.

It is an object of the present invention to provide novel haloalkoxysilanes.

It is another object of the present invention to provide novel compounds useful as nematocidal fumigants.

It is a further object of the present invention to provide a method for the preparation of novel haloalkoxysilanes.

It is a still further object to provide nematocidal fumigant compositions.

It is a further object yet to provide a method of controlling nematodes by subjecting the same to the action of certain novel nematocidal fumigants.

Another object yet is the provision of a method for treating soil with certain novel nematocidal fumigants.

These and other objects will become apparent from the following description and claims.

DESCRIPTION OF THE INVENTION

I have now discovered that novel haloalkoxysilanes of the general formula

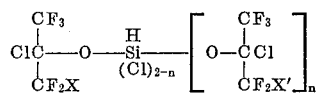

wherein X and X' are independently selected from the group consisting of F and Cl, and wherein $n$ is an integer from 0 to 1, are potent nematocidal fumigants.

Those novel compounds of the present invention wherein both X and X' are either F or Cl may be prepared by reacting trichlorosilane with hexafluoroacetone or pentafluorochloroacetone, respectively, as illustrated by the equations shown below:

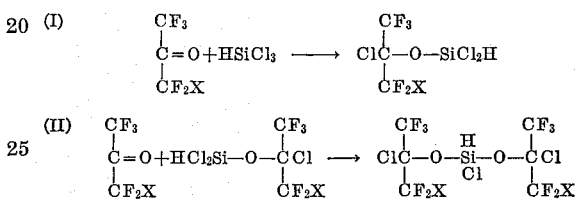

Reactions (I) and (II) proceed concurrently and the product obtained is a mixture of

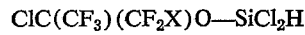

and

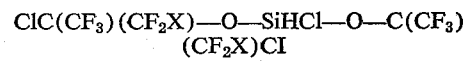

The novel compound

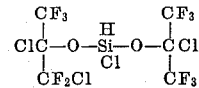

may be prepared by reacting 1,1,1,3,3,3-hexafluoro-2-chloroisopropoxydichlorosilane or 1 - chloro-1,1,3,3,3-pentafluoro - 2 - chloroisopropoxydichlorosilane with pentafluorochloroacetone or hexafluoroacetone, respectively, as illustrated below by the equation showing reaction of 1,1,1,3,3,3 - hexafluoro-2-chloroisopropoxydichlorosilane with pentafluorochloroacetone.

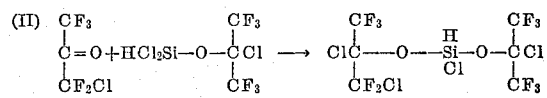

The reactions of both types, (I) and (II), must be carried out under exclusion of ultraviolet radiation of intensity substantially in excess of maximum intensities supplied by solar radiation on the earth's surface under most favorable conditions, say about 8 milliwatts per square centimeter. Ultraviolet radiation is radiation in the region of the electromagnetic spectrum including wave lengths from 100 to 3900 A. If these reactions are carried out in the presence of added ultraviolet irradiation, the compounds of the present invention are not obtained.

Preparation of the compounds of the present invention in accordance with the process of the present invention may be carried out in glass equipment in daylight or under normal artificial illumination.

The starting materials hexafluoroacetone, pentachlorofluoroacetone and trichlorosilane are commercially available compounds which may be prepared by known methods. Since the hexahaloacetone reactants are gaseous at normal temperature and pressure, the reactions are preferably carried out in closed vessels under superatmospheric pressure.

In reactions of both types, (I) and (II), reaction temperatures are not critical and may range between about 25° C. and about 200° C. Below about 25° C. the reactions proceed too slowly for practical operation. Speed of reaction, as well as reaction pressure, are functions of temperature and increases with increasing reaction temperature. Choice of reaction temperature involves a compromise between desire to obtain short reaction times and desire to avoid need for use of complex and expensive equipment as would be required for operation at pressures in excess of say about 150 p.s.i.g. For economical operation, reaction temperatures between about 40° C. and about 150° C. are preferred.

The reactions of trichlorosilane with hexahaloacetone or chloropentafluoroacetone yield as product a mixture of 1,1,1,3,3,3-hexahalo-2-chloroisopropoxydichlorosilane (I) and bis-[1,1,1,3,3,3-hexahalo-2-chloroisopropoxy] chlorosilane (II). While the molar ratio in which the reactants may be employed is not critical, formation of compounds (I), which are the reaction products of equimolar amounts of hexahaloacetone and trichlorosilane, tends to be favored by use of about equimolar amounts of hexahaloacetone and trichlorosilane, and formation of compounds (II), which are the reaction products of two mols of hexahaloacetone with one mol of trichlorosilane, tends to be favored by use of at least about 2 mols of hexahaloacetone per mol of trichlorosilane.

The product comprising a mixture of compounds (I) and compounds (II) may be recovered from the reaction mixture by conventional methods, such as by distilling off unreacted starting materials. Compounds (I) and (II) may be separated from each other and from unreacted starting material and/or byproducts, if present, by conventional methods, such as fractional distillation. It is to be understood, however, that for nematocidal fumigant use the compounds need not be separated from each other, but that they may be used in admixture with each other.

While the compound

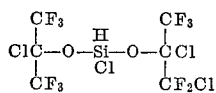

may be prepared by reacting, under the above-described process conditions, trichlorosilane with a mixture of hexafluoroacetone and chloropentafluoroacetone, which reaction yields as product a mixture of compounds having the formulas $ClC(CF_3)_2$—O—$SiHCl_2$
$ClC(CF_3)(CF_2Cl)$—O—$SiHCl_2$
$[ClC(CF_3)_2O]_2SiHCl$
$[ClC(CF_3)(CF_2Cl)O]_2SiHCl$ and $ClC(CF_3)_2$—O—SiHCl—O—$C(CF_3)(CF_2Cl)Cl$ that compound is preferably prepared by reacting, under the above-described process conditions, either 1,1,1,3,3,3-hexafluoro-2-chloroisopropoxydichlorosilane or 1-chloro-1,1,3,3,3-pentafluoro-2-chloroisopropoxydichlorosilane with chloropentafluoroacetone or hexafluoroacetone, respectively. The compounds bis-[1,1,1,3,3,3-hexafluoro-2-chloroisopropoxy] chlorosilane and bis-[1-chloro-1,1,3,3,3-pentafluoro-2-chloroisopropoxy] chlorosilane may be prepared in like manner by reacting the appropriate perhaloisopropoxydichlorosilane with the appropriate hexahaloacetone.

Control of nematodes by the haloalkoxysilanes of my invention can be effected by contacting the nematodes directly or by contacting the soil containing such nematodes alone or combined in compositions with other nematocidal adjuvants. When reference is made herein to contacting nematodes, it is to be understood that such contacting includes application to the nematodes per se, or to soil infested with nematodes. The nature of the compositions used will depend on circumstances and various factors such as mode of application, etc. The haloalkoxysilane-containing compositions may be applied to the nematodes or to nematode-infested soil in any conventional manner as by spraying, drenching or dusting. The term "soil" as used herein is intended to include any medium capable of supporting the growth of plants. It is therefore intended to include, in addition to soil, humus, manure, compost, sand and artificial plant growth media including hydroponic media.

In a preferred embodiment of the invention, the haloalkoxysilanes are distributed in the soil by introduction in water such as that employed to irrigate the soil. In this procedure the amount of water may be varied in accordance with the moisture content and the moisture equivalent of soil in order to obtain the desired depth of distribution of the toxic compound.

The haloalkoxysilanes described above may also be formulated as dust or granular compositions containing solid carriers or fillers such as talc, sand, fuller's earth, chalk, gypsum, and the like, including other active ingredients such as fertilizers, insecticides, herbicides and fungicides. The haloalkoxysilanes may be used for controlling nematodes without substantially affecting crops planted or growing in the soil.

The haloalkoxysilanes are effective as nematocides when distributed in the infested soil at a dosage of at least about 50 pounds per acre and preferably between about 100 to 300 pounds per acre. In order to obtain complete eradication of the undesired nematodes, it is desirable that the soil be impregnated with the haloalkoxysilanes to a depth of at least about 6 inches, and preferably to provide at least about 1.0 pound of toxicant per 1,000 cubic feet of soil. It will be understood by those skilled in the art that minimal dosages are preferred when concerned with post-emergent treatments.

The following example further illustrates the invention, but is not to be construed as limiting the same.

EXAMPLE

A glass pressure reactor of 100 ml. capacity equipped with a pressure gauge was charged with 16 grams trichlorosilane. Reactor and contents were then cooled to −78° C., the reactor air space was evacuated, and 23.5 grams of hexafluoroacetone were introduced into the reactor by means of a vacuum manifold. The reactor was sealed and reactor and contents were warmed to about 25° C. and were kept at that temperature for a period of 40 hours. Throughout this period the pressure within the reactor remained between about 50–55 p.s.i.g., which was taken as an indication that little if any reaction had taken place. Reactor and contents were then warmed to about 40–45° C. and were maintained at that temperature for a period of 72 hours. Initial internal pressure rise to about 75 p.s.i.g. was followed by gradual decline of internal pressure to about 20 p.s.i.g. at the end of the 72 hour period. The reactor was then cooled to room temperature, vented to the atmosphere, and liquid reactor contents were subjected to fractional distillation to recover 4.1 grams of unreacted trichlorosilane, 13.3 grams of 1,1,1,3,3,3-hexafluoro-2-chloroisopropoxydichlorosilane (B.P. 86° C., $n_D^{25}$=1.3386), and 5.2 grams of bis-[1,1,1,3,3,3-hexafluoro-2-chloroisopropoxy]chlorosilane (B.P. 136° C., $n_D^{25}$=1.3248).

Elemental analysis of the products compared with calculated values as follows:

ClC(CF$_3$)$_2$OSiHCl$_2$ Calculated (percent): C, 11.95; H, 0.33; Cl, 35.28. Found (percent): C, 11.72; H, 0.17; Cl, 34.88.

[ClC(CF$_3$)$_2$O]$_2$SiHCl Calculated (percent): C, 15.43; H, 0.22; Cl, 22.70. Found (percent): C, 15.24; H, 0.13; Cl, 22.37.

The assigned structures were confirmed by infrared and proton n.m.r. spectroscopy. The infrared spectra of both compounds showed Si-H stretching frequencies of close to 2300 cm.$^{-1}$; the proton n.m.r. spectrum of the compound ClC(CF$_3$)$_2$OSiHCl$_2$ showed a single peak at 5.96 p.p.m. ($\delta$ scale, relative to tetramethylsilane as internal standard), and the proton n.m.r. spectrum of the compound

[ClC(CF$_3$)$_2$O]$_2$SiHCl showed a single peak at 5.62 p.p.m., confirming the presence, in both compounds, of an uncoupled proton bound to a silicon atom also carrying halogen.

When the 1,1,1,3,3,3-hexafluoro-2-chloroisopropoxydichlorosilane product is reacted with chloropentafluoroacetone under the reaction conditions of this example, there is obtained as product the compound (1,1,1,3,3,3-hexafluoro - 2 - chloroisopropoxy)(1 - chloro - 1,1,3,3,3 - pentafluoroisopropoxy) chlorosilane.

The effectiveness of the new nematocidal fumigants for use according to my invention is illustrated by the tests described below.

About 100 nematodes (*Penagrellus redivivus*) were placed in a small petri dish containing 5 ml. of distilled water. The dish was placed open in a gallon Mason jar. About 0.06 gram of the toxicant compound (equivalent to 1 pound of test compound per 1000 cubic feet of air) was placed in the jar on a cellucotton wad, and the jar was sealed. After 24 hours' exposure the nematode-containing dish was removed and a mortality count was made. In each case there were run concurrent check tests employing no fumigants, but under otherwise equal conditions. Results of the test are shown in the table below.

TABLE

| Compound: | Percent kill |
|---|---|
| ClC(CF$_3$)$_2$OSiHCl$_2$ | 100 |
| [ClC(CF$_3$)$_2$O]$_2$SiHCl | 100 |
| Check | 0 |

While the above describes the preferred embodiments of my invention, it is to be understood that departures can be made therefrom within the scope of the specification and claims.

I claim:
1. Compounds having the formula

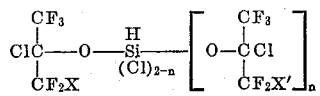

wherein X and X' are independently selected from the group consisting of F and Cl, and wherein *n* is an integer from 0 to 1.

2. Compounds according to claim 1 wherein X and X' are both F.

3. Compounds according to claim 1 wherein *n* is 1.

4. A compound according to claim 2 having the formula

ClC(CF$_3$)$_2$—O—SiHCl$_2$

5. A compound according to claim 2 having the formula

[ClC(CF$_3$)$_2$O]$_2$SiHCl

6. A method for preparing compounds according to claim 1 which comprises reacting, under exclusion of ultraviolet radiation of intensity substantially in excess of about 8 milliwatts per square centimeter, trichlorosilane with a hexahaloacetone selected from the group consisting of hexafluoroacetone, chloropentafluoroacetone and mixtures thereof.

7. The method for preparing compounds according to claim 1 wherein *n* is 1 which comprises reacting, under exclusion of ultraviolet irradiation of intensity substantially in excess of about 8 milliwatts per square centimeter, a compound according to claim 1 wherein *n* is 0 with a hexahaloacetone selected from the group consisting of hexafluoroacetone and chloropentafluoroacetone.

References Cited

UNITED STATES PATENTS

| 2,909,552 | 10/1959 | Chevalier | 260—448.8 |
| 3,038,000 | 6/1962 | Schmidt | 260—448.8 X |
| 3,331,813 | 7/1967 | Pittman et al. | 260—448.8 X |
| 3,422,131 | 1/1969 | Pittman et al. | 260—448.2 |

OTHER REFERENCES

Janzen et al., C.A., 63, pp. 18138M—18139, 1965.
Cullen et al., C.A., 63, p. 14353g, 1965.

HELEN M. McCARTHY, Primary Examiner
P. F. SHAVER, Assistant Examiner

U.S. Cl. X.R.
260—999; 424—184